United States Patent
Bae et al.

(10) Patent No.: US 9,325,830 B2
(45) Date of Patent: Apr. 26, 2016

(54) METHOD AND APPARATUS FOR PROVIDING IDLE MODE SERVICE

(75) Inventors: Han-Up Bae, Seoul (KR); Tae-Beom Heo, Kyundki-do (KR); Gwi-Ho Chun, Seoul (KR)

(73) Assignee: KT CORPORATION, Kyeonggi-Do (KR)

( * ) Notice: Subject to any disclaimer, the term of this patent is extended or adjusted under 35 U.S.C. 154(b) by 0 days.

(21) Appl. No.: 13/614,292

(22) Filed: Sep. 13, 2012

(65) Prior Publication Data

US 2013/0013709 A1 Jan. 10, 2013

Related U.S. Application Data

(63) Continuation of application No. 12/293,515, filed as application No. PCT/KR2006/001103 on Mar. 24, 2006.

(51) Int. Cl.
*H04M 1/725* (2006.01)
*H04W 4/18* (2009.01)

(52) U.S. Cl.
CPC ............ *H04M 1/72544* (2013.01); *H04W 4/18* (2013.01)

(58) Field of Classification Search
CPC ......... H04W 4/14; H04W 4/001; H04W 4/12; H04W 4/16; H04W 88/02; H04W 8/22; H04W 4/185; H04W 4/18; H04M 1/72544; H04M 1/72563
USPC ............... 345/1.1, 1.2, 1.3, 2.1, 2.2, 2.3, 106, 345/902, 903; 455/412.1, 414.2, 414.3, 455/414.4, 466, 566; 715/781, 825, 826, 715/828, 829, 841, 857
See application file for complete search history.

(56) References Cited

U.S. PATENT DOCUMENTS

| | | | |
|---|---|---|---|
| 5,109,543 A | 4/1992 | Dissosway et al. | |
| 6,249,681 B1 | 6/2001 | Virtanen | |
| 6,363,419 B1 | 3/2002 | Martin et al. | |
| 7,020,685 B1* | 3/2006 | Chen et al. | 709/204 |
| 2002/0016854 A1* | 2/2002 | Hirasawa et al. | 709/236 |

(Continued)

FOREIGN PATENT DOCUMENTS

| | | |
|---|---|---|
| JP | 2003134270 | 5/2003 |
| KR | 1020030095607 | 12/2003 |

(Continued)

OTHER PUBLICATIONS

PCT/KR2006/001103 International Search Report.

(Continued)

*Primary Examiner* — Dinh P Nguyen
(74) *Attorney, Agent, or Firm* — Brundidge & Stanger, P.C.

(57) ABSTRACT

A method for providing an idle mode service uses an idle mode service server system interlocking with a contents provider server and at least one mobile communication terminal. State information is received from the at least one mobile communication terminal, and a push message is transmitted to the at least one mobile communication terminal in consideration of the sate information upon receiving a push message transmission request from the contents provider server. Thereafter, contents are transmitted to the at least one mobile communication terminal according to the push message transmission. Also, specific contents can be provided with or without the request and consent of a user. Consequently, the system and method according to the present invention can control an idle-screen application through a combination between interworking systems.

13 Claims, 3 Drawing Sheets

(56) References Cited

U.S. PATENT DOCUMENTS

| | | |
|---|---|---|
| 2002/0058522 A1* | 5/2002 | Kim et al. ............... 455/466 |
| 2002/0083157 A1* | 6/2002 | Sekiguchi et al. ............ 709/219 |
| 2002/0170053 A1* | 11/2002 | Peterka et al. ................ 725/31 |
| 2003/0093530 A1 | 5/2003 | Syed |
| 2005/0070251 A1 | 3/2005 | Satake et al. |
| 2005/0138105 A1 | 6/2005 | Lee et al. |
| 2006/0056381 A1 | 3/2006 | Kim |
| 2006/0156256 A1 | 7/2006 | Lee |
| 2008/0178095 A1 | 7/2008 | Lee |

FOREIGN PATENT DOCUMENTS

| | | |
|---|---|---|
| WO | 02/14976 | 2/2002 |
| WO | 2004003708 | 1/2004 |
| WO | 2005/104572 | 11/2005 |

OTHER PUBLICATIONS

Japanese Office Action for Application No. 2009-501335 mailed Nov. 22, 2011.

* cited by examiner

| Field | Value | Maximum size (Max 55) |
|---|---|---|
| 501 — MSG_TYPE | 07 | 2 |
| 503 — CONTENTS_KEY | PULL data key (013847190) | Max 10 |
| 505 — CONFIRM_MSG | A new picture has arrived. do you want to receive it? | Max 40 |
| 507 — APP_DATA | Define action of application | Max 50 |

| Field | Value | Maximum size (Max 55) |
|---|---|---|
| 601 — MSG_TYPE | 08 | 2 |
| 603 — CALLBACK_URL | Page URL | Max 50 |
| 605 — CONFIRM_MSG | Do you want to connect to a ranking server? | Max 40 |
| 607 — APP_DATA | Define action of application | Max 50 |

METHOD AND APPARATUS FOR PROVIDING IDLE MODE SERVICE

CROSS-REFERENCE TO RELATED APPLICATION

The present application is a continuation of U.S. application Ser. No. 12/293,515, filed Sep. 18, 2008, which is an U.S. national phase application of International application No. PCT/KR2006/001103, filed on Mar. 24, 2006, the entirety of which is incorporated herein by reference.

TECHNICAL FIELD

The present invention relates to a method and apparatus for providing an idle mode service, and more particularly, to a method and apparatus for providing an idle mode service by pushing or push-pulling a message between a mobile communication terminal and a contents server.

BACKGROUND ART

In general, an idle mode service is a service that enables a user to receive desired information in an idle mode of a mobile communication terminal and to use contents that are not stored in the mobile communication terminal.

In a conventional idle mode service, service providers are unable to directly transmit contents from a contents server to a mobile, but merely informs users of the possibility of transmission of contents indirectly through an SMS message. In addition, in order to enjoy contents, users must connect to an URL or a calling number contained in an SMS message received from a service provider and then download data of the contents.

However, in a conventional method, in order to change a background image of a mobile communication terminal or receive specific information, users must perform data communication in an active (call) mode of the mobile communication terminal and then receive data from a contents server to update the background image.

Therefore, in the case of the conventional method, in order to obtain desired information or contents, users must make a call connection to a service provider or perform data communication with a content server. Also, the users are charged a communication fee for a time period from the start point of the connection to the time when the desired contents are found. In addition, the service provider is unable to directly transmit even no-charge advertisements when there is no connection of a user. Also, since users are reluctant to connect communication due to the burden of a communication fee, a content market is difficult to activate.

DISCLOSURE OF INVENTION

Technical Problem

An object of the present invention is to provide an idle mode service providing method and apparatus that can be used without the connection to a content server by a user.

Another object of the present invention is to provide an idle mode service providing method and apparatus using a PUSH_PULL mode without the need of the consent of a user.

A further object of the present invention is to provide an idle mode service providing method and apparatus using a PUSH&PULL mode with the need for the consent of a user.

Technical Solution

In order to achieve the above objects, the present invention provides a method for providing an idle mode service using an idle mode service server system interlocking with a contents provider server and at least one mobile communication terminal, the method including: receiving state information from the at least one mobile communication terminal; transmitting a push message to the at least one mobile communication terminal in consideration of the sate information upon receiving a push message transmission request from the contents provider server, the push message including information for providing contents to the at least one mobile communication terminal; and transmitting contents to the at least one mobile communication terminal according to the push message transmission.

The method may further include receiving contents from the contents provider server and storing the contents, and allocating a contents key when the contents provided from the contents provider server is stored.

In another aspect of the present invention, a method for providing an idle mode service using an idle mode service system including an idle mode service server system interlocking with a contents provider server and at least one mobile communication terminal, includes: receiving, at the idle mode service server system, state information from the at least one mobile communication terminal; transmitting a push message from the idle mode service server system to the at least one mobile communication terminal in consideration of the sate information upon receiving a push message transmission request from the contents provider server; identifying, at the mobile communication terminal, a page URL contained in the push message and to browse a server to connect to; and receiving corresponding contents from the browsed server and applying the received contents to an application.

The method may further include, upon receiving the push message at the mobile communication terminal, executing an application action contained in the push message and then obtaining consent of a user to browse to the server.

In a further aspect of the present invention, an idle mode service system interworking with at least one mobile communication terminal, includes: a contents provider server storing contents provided from a contents provider and performing a push message request; and an idle mode service server system receiving state information from the at least one mobile communication terminal, transmitting a push message to the at least one mobile communication terminal in consideration of the state information upon receiving a push message request from the contents provider server, and transmitting contents provided from the contents provider server to the at least one mobile communication terminal.

The idle mode service server system may include: a contents cashing manager server receiving a push message transmission request from the contents provider server, and receiving and storing contents at, before or after the push message request; a push manage system server receiving a push message request from the contents cashing manager server, requesting state information, and transmitting a push message to the at least one mobile communication terminal in consideration of the state information; and a mobile signal interface server receiving state information from the at least one mobile communication terminal and transmitting the state information to the push manage system server.

The mobile signal interface server may receive a contents request signal, which is transmitted according to reception of the push message at the at least one mobile communication terminal, and transmit the received contents request signal to the contents cashing manager server.

The contents cashing manager server may receive a contents request signal from the at least one mobile communication terminal, and transmit contents to the mobile communication terminal through the mobile signal interface server.

The contents cashing manager server may automatically transmit prestored contents to the mobile communication terminal.

Advantageous Effects

Accordingly, the present invention can provide an idle mode service that can be used without the connection to a contents server by a user. Also, it is possible to provide specific contents with or without the request and consent of a user. Consequently, the system according to the present invention can control an idle-screen application through a combination between interworking systems.

BRIEF DESCRIPTION OF THE DRAWINGS

FIG. 5 is a conceptual diagram illustrating a data structure of a manual PUSH& PULL mode push message for pulling registered contents according to a third embodiment of the present invention.

FIG. 6 is a conceptual diagram illustrating a data structure of a manual PUSH& PULL mode push message for browsing a Web page on a mobile communication terminal according to a fourth embodiment of the present invention.

BEST MODE FOR CARRYING OUT THE INVENTION

Figure 1:
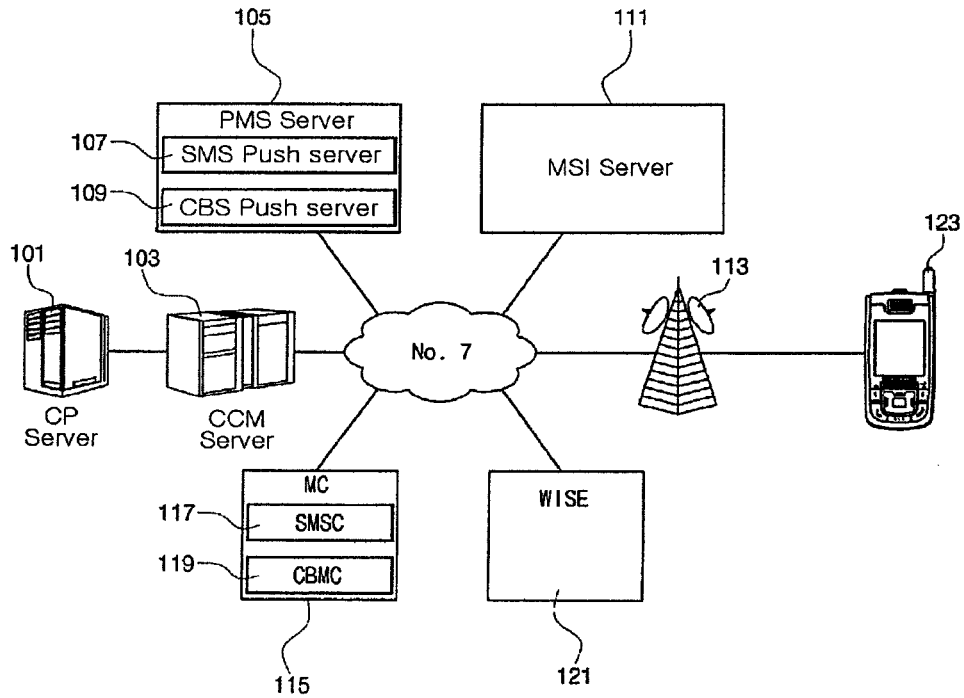
FIG. 1 is a schematic diagram illustrating a structure of an idle mode service providing system according to preferred embodiments of the present invention.

Hereinafter, preferred embodiments of the present invention will be described in detail with reference to the attached drawings. Like reference numerals in the drawings denote like elements. Detailed descriptions about well-known functions or structures will be omitted if they are deemed to obscure the subject matter of the present invention.

As an example, the present invention illustrates a system using an idle-screen application based on the WIN platform. The system of the present invention transmits contents by relaying, transmitting and pushing a push message that is requested by a contents service provider. To this end, information is exchanged by a PULL mode where a mobile communication terminal transmits a contents request message. That is, a message transmission standard is divided into a PUSH message transmission standard by which a message is unidirectionally transmitted to a mobile communication terminal and a PULL message transmission standard by which, after the PUSH operation, an application of the mobile communication terminal transmits a data request signal to a server to download contents. This message transmission standard cannot provide a desired results when the contents of a message transmitted to the mobile communication terminal are improper. Therefore, the message transmission standard must represent limited bytes, a character string, and a function that are defined in an idle mode service providing system. The PUSH is a process where the final results are usually terminated in an application, such as an operation of a mobile communication terminal application, function execution, and information transmission. The PULL is a process by which an application connects to a server in response to the PUSH process and then data are downloaded and stored in the mobile communication terminal, which can solve the problem that the PUSH cannot transmit data directly. Accordingly, the present invention provides embodiments where a PULL function according to the following methods is added using an idle-screen application.

The embodiments of the present invention will be described discriminatively according to a PUSH_PULL mode and a PUSH&PULL mode. In the PUSH_PULL mode, data (contents) are provided without the request and consent of a user. In the PUSH&PULL mode, data are provided with the consent of a user. Also, the PUSH_PULL mode and the PUSH&PULL mode will be described discriminatively according to a manual function and an automatic function. The manual function is used to full registered contents, and the automatic function is used to browse a Web page. Idle mode service providing systems and methods are identically applied in the embodiments of the present invention, and can be discriminated according to push messages to be transmitted to a mobile communication terminal. These push messages will be described later in detail. An idle mode service system according to an embodiment of the present invention will now be described with reference to the accompanying drawings.

FIG. 1 is a schematic diagram illustrating a structure of an idle mode service providing system according to preferred embodiments of the present invention.

Referring to FIG. 1, an idle mode service system includes a contents provider (CP) server 101, a contents cashing manager (CCM) server 103, a push manage system (PMS) server 105, a mobile signal interface (MSI) server 111, a base transceiver station (BTS) 113, a message center (MC) 115, a wireless information system environment (WISE) 121, and a mobile communication terminal 123.

The CP server 101 stores contents provided by contents providers, and, if necessary, transmits contents to users through the CCM server 103, together with a message PUSH request.

The CCM server 103 uploads contents provided by the CP server 101, and transmits the message PUSH request from the CP server 101 to the PMS server 105. When receiving a plurality of message PUSH requests from a plurality of CP servers 101, the CCM server 103 schedules a message PUSH sequence.

The PMS serve 105 includes: an SMS push server 107 transmitting an SMS message via the MC 115; and a CBS push server 119 transmitting a CBS message. When receiving the message PUSH request from the CP server 101 via the CCM server 103, the PMS server 105 transmits a message the mobile communication terminal 123 via the MC 115.

The MSI server 111 receives information about a ticker channel list and a set/release status of an application of the mobile communication terminal 123. When receiving a contents transmit request form the mobile communication terminal 123 after transmission of a push message to the mobile communication terminal 123, the MSI server 111 transmits contents to the application. Here, the ticker is a service for providing specific information to users in real time through a specific area set on an idle screen of the mobile communication terminal 123.

A system for providing contents from the CP server 101 to the mobile communication terminal 123, including the CCM server 103, the PMS server 105 and the MSI server 111, is referred to as "an idle mode service server system".

The BTS 113 performs baseband signal processing, wireline/wireless conversion, and transmission/reception of a radio signal. The BTS 113 is a network terminating device that is directly connected to a subscriber terminal. The BTS 113 includes an RF processor (not illustrated) and a baseband processor (not illustrated) including a controller and a channel for processing a mobile communication protocol. The BTS 113 transmits a push message to the mobile communication terminal 123 in response to the request of the CP server 101. When there is a contents transmit request from the CCM server due to a contents request of the mobile communication terminal, the BTS 113 transmits contents to the mobile communication terminal 123 under the control of a BTS controller (not illustrated).

The MC 115 includes: a short message service center (SMSC) 117 interworking with the SMS push server 107 to transmit a SMS message to the mobile communication terminal 123; and a cell broadcasting service center (CBMC) 119 interworking with the CBS push server 109 to transmit a CBS message to the mobile communication terminal 123. The MC 115 transmits a push message from each MC 115 to the mobile communication terminal 123 according to user classes and characteristics of contents to be provided.

The WISE 121 is a system building device by which a mobile communication service provider seeks to enhance a business image through management of a CS (customer satisfied) center or to enhance its reliability by on-line processing of a charging operation. The WISE performs operations of subscribing/unsubscribing new users, an operation of changing information of subscribers, a charging service operation, and a centralized charging management operation.

The mobile communication terminal 123 may be a variety of communication devices such as general portable phones, 3GPP terminals, PDAs, and smart phones. The mobile communication terminal 123 may basically be a terminal that can provide a message service and data communication together with a call service. The mobile communication terminal 123 is mounted with an idle mode service application, receives a push message from the CP server 101, and receives and displays contents automatically or by selection by a user.

Idle mode service providing systems in the above idle mode service providing system according to embodiments of the present invention will now be described in detail with reference to the accompanying drawings.

Figure 2:
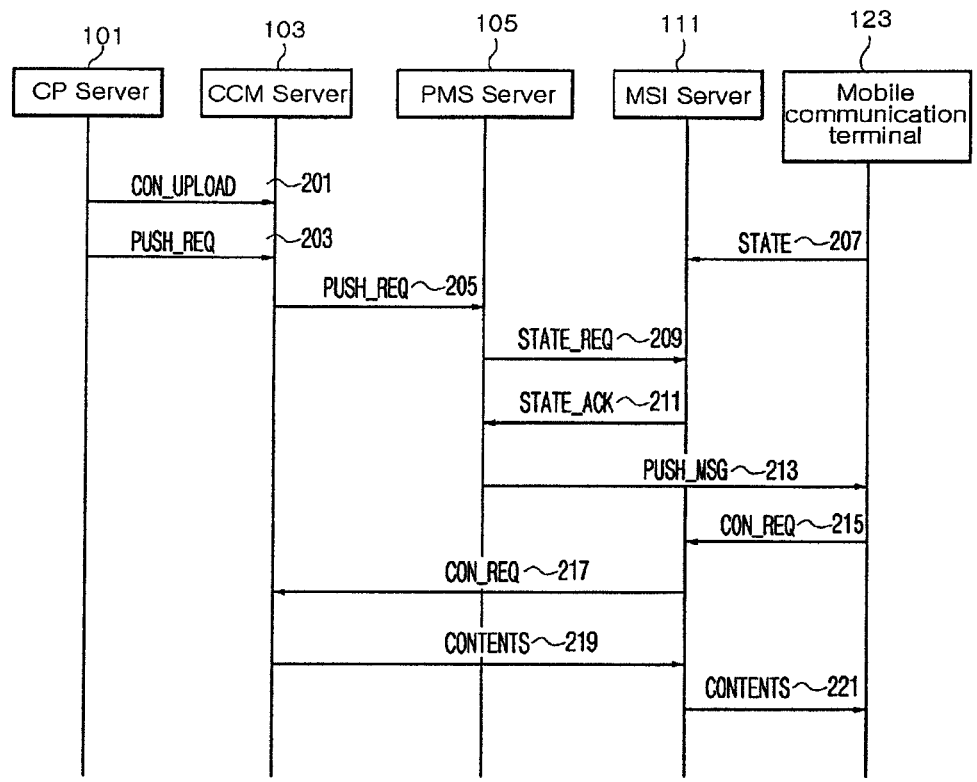
FIG. 2 is a signal flow diagram illustrating message/contents push processes for providing an idle mode service according to preferred embodiments of the present invention.

FIG. 2 is a signal flow diagram illustrating a message/contents push process for providing an idle mode service according to preferred embodiments of the present invention.

Referring to 2, the service providing process can be divided into a process of transmitting a push message in response to the request of the CP server 101 and a process of providing PULL contents in response to the request of the mobile communication terminal 123. The push message has a predetermined data structure, which will be described later.

In operation 5201, the CP server 101 transmits a contents upload signal CON_UPLOAD to the CCM server 103. The contents upload signal CON_UPLOAD is a signal by which the CP server 101 uploads contents to the CCM server 103. The uploaded contents is endowed with a contents key so that it can be extracted in response to the contents transmit request from the mobile communication terminal 123.

In operation 203, the CP server 101 transmits a push request signal PUSH_REQ to the CCM server 103. The push request signal PUSH_REQ is a signal that is used for requesting a push message for the contents to be transmitted to the mobile communication terminal 123. Although FIG. 2 illustrates that push message transmission is requested after uploading of contents in the case of automatic/manual methods for pulling contents registered according to the first and third embodiments of the present invention, the contents may be uploaded simultaneously with or after the push request. In addition, a contents uploading operation may be omitted in the case of a service for browsing an URL according to the second and fourth embodiments of the present invention. In operation 205, the CCM 103 transmits a push request signal to the PMS server 105. The push request signal is a signal that is used for relaying the push request signal received from the CP server 101.

In operation 207, the mobile communication terminal 123 transmits a state signal STATE to the MSI server 111. The state signal STATE indicates the state of the mobile communication terminal 123, such as a call state or an idle state. In the case of the idle state, the state signal STATE indicates a set or release state of a popup application. Accordingly, the MSI server 111 uses state information, which is received from the mobile communication terminal 123 mounted with an idle mode service application, as criteria for message transmission. Accordingly, the state signal STATE is a signal indicating a state just before a state request signal STATE_REQ for transmission of the push message is received.

In operation 209, upon receiving the push request signal PUSH_REQ, the PMS 105 transmits the state request signal STATE_REQ to the MSI server 111. The state request signal STATE_REQ is a signal for inquiring the state of the mobile communication terminal 123. In operation 211, the MSI server 111 transmits a state response signal STATE_ACK to the PMS server 105. The state response signal STATE_REQ is a response signal for the state request signal STATE_REQ. That is, the state response signal STATE_REQ is a signal for informing the set/release state and the idle state of the mobile communication terminal 123.

In operation 213, upon receiving the state response signal STATE_ACK from the MSI server 111, the PMS server 105 transmits a push message PUSH_MSG to the mobile communication terminal 123. The push message PUSH_MSG includes a contents type, a contents key, and application data, which are provided by the CP server 101. According to the types of contents, the push message PUSH_MSG is transmitted using an SMS message, a multimedia messaging service (MMS) message, or a CBS message.

In operation 215, upon receiving the push message PUSH_MSG, the mobile communication terminal 123 transmits a contents request signal CON_REQ to the MSI server 111. The contents request signal CON_REQ is a signal by which the mobile communication terminal 123 requests contests corresponding to the received push message PUSH_MSG. The contents request signal CON_REQ may be generated by two methods. One method is that the contents request signal CON_REQ is automatically generated by an application in the mobile communication terminal 123 according to the first and second embodiments of the present invention, which is defined as a PUSH_PULL mode. The other method is that the contents request signal CON_REQ is manually generated by an application in the mobile communication terminal 123 with approval of a user according to the third and fourth embodiments of the present invention, which is defined as a PUSH&PULL mode.

In operation 217, upon receiving the contents request signal CON_REQ from the mobile communication terminal 123, the MSI server 111 transmits a contents request signal CON_REQ to the CCM server 103. The contents request signal CON_REQ transmitted to the CCM server 103 is a signal for requesting extraction of contents stored in the CCM server 103.

In operation 219, the CCM server 103 extracts contents, which is requested by the mobile communication terminal 123, from a memory on the basis of a contents key value contained in the contents request signal CON_REQ, and transmits the extracted contents to the MSI server 111. Although the contents are illustrated as being stored and managed by the CCM server 103, the present invention is not limited to this. For example, in the case of URL browsing, a page to be browsing by the contents may not be stored in the CCM server 103. In this case, the contents request signal CON_REQ may be transmitted to the CP server 101.

In operation 221, upon receiving the extracted contents, the MSI server 111 transmits the received contents to the mobile communication terminal 123. Accordingly, the mobile communication terminal 123 displays the received contents on its display unit.

In the above idle mode service providing method, to download data after the push message transmission, the mobile communication terminal 123 connects to the servers of the idle mode service server system. Alternatively, the mobile communication terminal 123 may be provided with idle mode service contents (data) by connection to a server of a service provider via a general communication path.

Meanwhile, in the second and fourth embodiments of the present invention, without the need to perform operations 215 to 221 for pulling registered in the idle mode service server system after reception of the push message PUSH_MSG in operation 213, a page URL is contained in the push message and the mobile communication terminal 123 is provided with contents by checking the page URL and connecting to a corresponding server through browsing.

The structures of push messages according to the embodiments of the present invention will now be described in detail with reference to the accompanying drawings.

The first embodiment of the present invention describes a push message that is used in the case where contents are provided using the automatic PUSH_PULL mode for pulling registered contents, that is, the case where data (contents) are provided without the request and consent of a user. This push message is referred to as a PUSH_PULL message.

Figure 3:
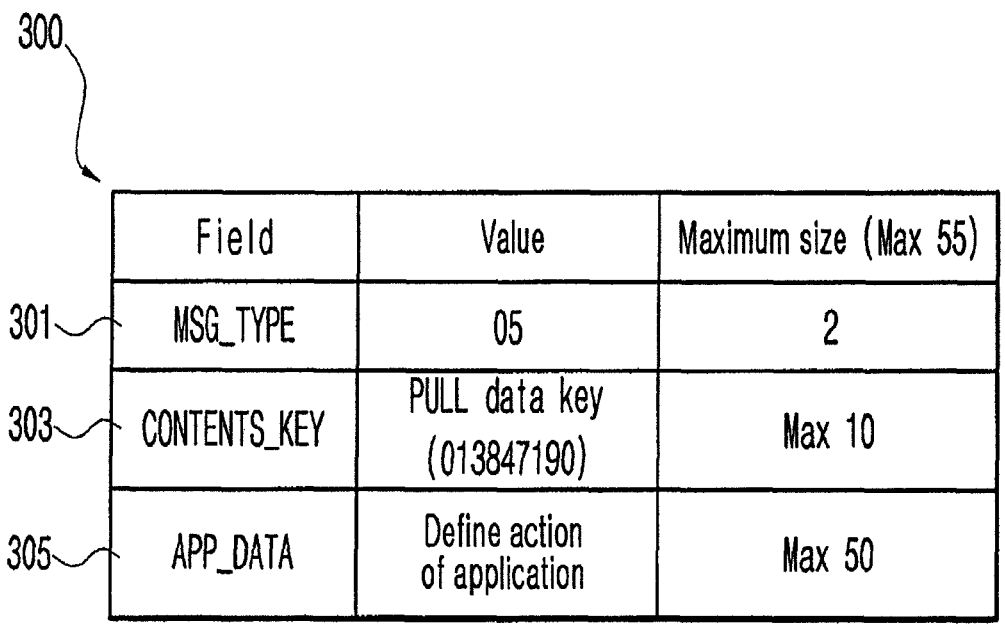
FIG. 3 is a conceptual diagram illustrating a data structure of an automatic PUSH_PULL mode push message for pulling registered contents according to a first embodiment of the present invention.

A payload of the PUSH_PULL message according to the first embodiment of the present invention has a format illustrated in FIG. 3. The PUSH_PULL message uses 'I' as a divider for each field, and PULL accompanying an action of an application is a message type where the application takes a specific action before or after reception of contents. In the first embodiment of the present invention, since contents exist in the CP server 101 or the CCM server 103 of the idle mode service server system, the mobile communication terminal 123 requests the above serve to transmit contents.

Referring to FIG. 3, a PUSH_PULL mode push message data 300 includes a message type field MSG_TYPE 301, a content key field CONTENT_KEY 303, and an application type field APP_DATA 305. The message type field MSG_TYPE 301 indicates the type of a message. In the case of a PUSH_PULL message for pulling contents stored in the CP server 101 or the CCM server 103 of the idle mode service server system, the message type field MSG_TYPE 301 uses a value of 05 and has a size of 2 bytes. The content key field CONTENT_KEY 303 indicates a key value of stored PULL contents (data), and has the maximum size of 10 bytes. The application type field APP_DATA 305 is a message defining an action of an application, and has the maximum size of 50 bytes. Here, the size of the PUSH_PULL mode push message data 300 cannot exceed 55 bytes.

The second embodiment of the present invention describes a push message that is used in the case where contents are provided using the automatic PUSH_PULL mode for browsing a specific URL of a Web page on the mobile communication terminal 123, that is, the case where data (contents) are received and applied in an application without the consent of a user. This push message is called a PUSH_PULL message.

Figure 4:
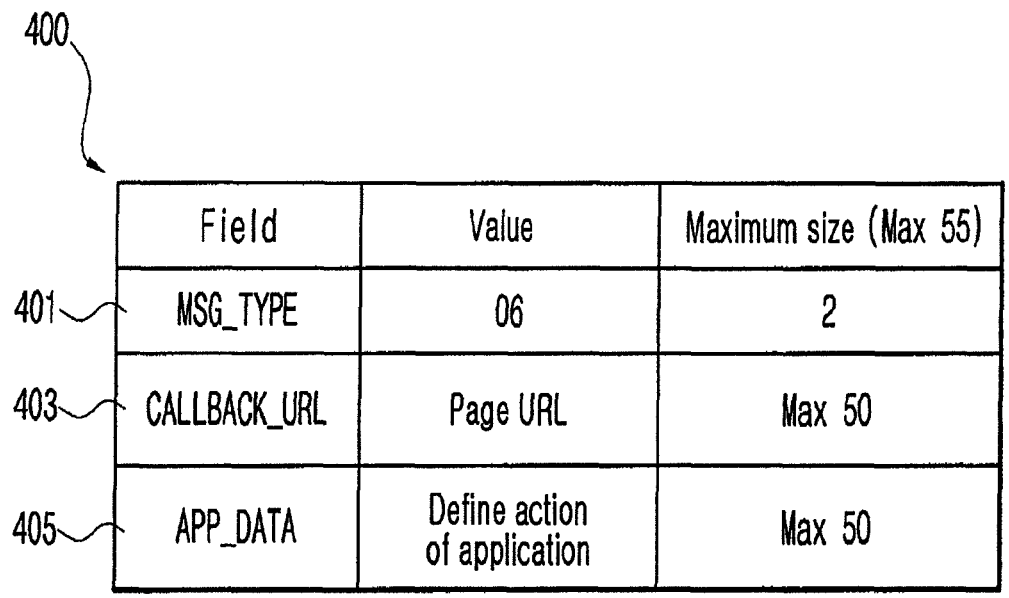
FIG. 4 is a conceptual diagram illustrating a data structure of an automatic PUSH_PULL mode push message for browsing a Web page on a mobile communication terminal according to a second embodiment of the present invention.

A payload of the PUSH_PULL message according to the second embodiment of the present invention has a format illustrated in FIG. 4. The PUSH_PULL message uses 'I' as a divider for each field. A specific URL is browsed using a browser after an application performs an action defined by the CP server 101.

Referring to FIG. 4, a payload of a PUSH_PULL message 400 includes a message type field MSG_TYPE 401, a call back URL field CALLBACK_URL 403, and an application type field APP_DATA 405. The message type field MSG_TYPE 401 indicates the type of a message. In the case of a PUSH_PULL message for browsing a specific URL, the message type field MSG_TYPE 401 uses a value of 06 and has a size of 2 bytes. The call back URL field CALLBACK_URL 403 indicates an URL of a specific page for browsing, and has the maximum size of 10 bytes. The application type field APP_DATA 405 defines an action of an application, and has the maximum size of 50 bytes. Here, the size of the push message data 400 cannot exceed 55 bytes.

The third embodiment of the present invention describes a push message that is used in the case where contents are provided using the manual PUSH&PULL mode for pulling registered contents, that is, the case where data (contents) are provided with the request and consent of a user. This push message is referred to as a PUSH&PULL message.

A payload of the PUSH_PULL message according to the third embodiment of the present invention has a format illustrated in FIG. 5. The PUSH&PULL message uses 'I' as a divider for each field. Contents exist in the idle mode service server system, and a contents transmit request is sent to the CP server 101 or the CCM server 103.

Referring to FIG. 5, a PUSH&PULL mode push message data 500 includes a message type field MSG_TYPE 501, a content key field CONTENT_KEY 503, a CONFIG_MSG field 505, and an application type field APP_DATA 507. The message type field MSG_TYPE 501 indicates the type of a message. In the case of a PUSH& PULL message for pulling stored contents stored, the message type field MSG_TYPE 501 uses a value of 07 and has a size of 2 bytes. The content key field CONTENT_KEY 503 indicates a key value of the stored PULL contents, and has the maximum size of 10 bytes. The CONFIG_MSG field 505 includes message data to be confirmed by a user before the pulling of contents. For example, the CONFIG_MSG field 505 includes a message "A NEW PICTURE HAS ARRIVED. DO YOU WANT TO RECEIVE IT?", and has the maximum size of 10 bytes. When there is no confirmation of a user with respect to a PULL action, a fixed default confirmation message must exist in each application. The application type field APP_DATA 507 is a message defining an action of an application, and has the maximum size of 50 bytes.

The fourth embodiment of the present invention describes a push message that is used in the case where contents are provided using the manual PUSH&PULL mode for browsing a specific URL of a Web page on the mobile communication terminal 123, that is, the case where data (contents) are provided with the request and consent of a user. This push message is called a PUSH&PULL message.

A payload of the PUSH&PULL message according to the fourth embodiment of the present invention has a format illustrated in FIG. 6. The PUSH_PULL message uses 'l' as a divider for each field. A specific URL is browsed using a browser, passing through confirmation of a user, after an application performs an action defined by the CP server 101.

Referring to FIG. 6, a PUSH&PULL mode push message data 600 includes a message type field MSG_TYPE 601, a call back URL field CALLBACK_URL 603, a confirmation message field CONFIRM_MSG 605, and an application type field APP_DATA 607. The message type field MSG_TYPE 601 indicates the type of a message. In the case of a PUSH&PULL message for browsing a specific URL, the message type field MSG_TYPE 601 uses a value of 08 and has a size of 2 bytes. The call back URL field CALLBACK_URL 603 indicates an URL of a specific page for browsing, and has the maximum size of 50 bytes. The CONFIG_MSG field 605 includes message data to be confirmed by a user before the pulling of contents. For example, the CONFIG_MSG field 605 includes a message "DO YOU WANT TO CONNECT TO A RANKING SERVER?", and has the maximum size of 40 bytes. When there is no confirmation message of a user with respect to an action for browsing a specific action, a fixed default confirmation message must exist in each application. The application type field APP_DATA 607 is a message defining an action of an application, and has the maximum size of 50 bytes. Here, the size of the push message data 600 cannot exceed 55 bytes.

Although the present invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

The present invention provides a method for providing an idle mode service using an idle mode service server system interlocking with a contents provider server and at least one mobile communication terminal. The method includes receiving state information from the at least one mobile communication terminal, transmitting a push message to the at least one mobile communication terminal in consideration of the sate information upon receiving a push message transmission request from the contents provider server, and transmitting contents to the at least one mobile communication terminal according to the push message transmission. Accordingly, it is possible to provide an idle mode service that can be used without the connection to a contents server by a user. Also, specific contents can be provided with or without the request and consent of a user. Consequently, the system and method according to the present invention can control an idle-screen application through a combination between interworking systems.

What is claimed is:
1. A method performed by a server system, comprising:
receiving, by a push server, from a content provider, a request to push data to a client;
receiving, by a client interface, from the client, state information indicative of a state of the client, wherein the state information indicates whether the state of the client is idle;
transmitting, by the push server, a state information request to the client interface;
receiving, by the push server, from the client interface, a state information response;
transmitting, by the push server, a message to the client, based on the state information response, to inform the client of the request to push data thereto, wherein the message includes a content key;
responsive to receiving, by the client interface, from the client, a content request that includes the content key, transmitting a request for the data to a content manager; and
responsive to receiving the requested data from the content manager, transmitting, by the client interface, the requested data to the client.

2. The method of claim 1, wherein the receiving of the request to push data includes receiving the request to push data from a content provider via the content manager.

3. The method of claim 1, wherein the receiving the state information comprises receiving the state information and the content key from the client via a client device.

4. The method of claim 1, wherein the confirmation receipt received from the client is based on user input to the client.

5. The method of claim 1, further comprising:
relaying, from the client, a request for the data to be pushed to the client.

6. The method of claim 1, further comprising:
transmitting a URL to the client.

7. The method of claim 1, further comprising:
transmitting instructions for the content manager to push the data to the client.

8. The method of claim 7, wherein the data comprises a file that exceeds a threshold size.

9. A system, comprising:
a content manager;
a push management server; and
a client interface;
wherein:
the content manager is configured to transmit, to the push management server, a request to push data to a client;
the push management server is configured to:
transmit a state information request to the client interface;
receive, from the client interface, a state information response;
transmit a message including a content key to the client based on the state information response; and
the client interface is configured to:
receive, from the client, state information indicative of a state of the client,
wherein the state information indicates whether the state of the client is idle,
transmit the state information response in response to receiving the state information request from the push management server,
in response to receiving from the client a content request that includes the content key, transmit a request for the data to the content manager, and
in response to receiving the data from the content manager, transmit the data to the client.

10. The system of claim 9, wherein the push management server is further configured to transmit the message including the key to the client in response to receiving the request to push the data from the content manager.

11. The system of claim 9, wherein the push management service is further configured to transmit the data to the client when the data is less than a threshold size amount.

12. The system of claim 11, wherein the data is a URL.

13. The system of claim 9, wherein the data is a file that exceeds a threshold size amount.

* * * * *